E. J. HEMINGTON.
TIRE.
APPLICATION FILED OCT. 24, 1913.
1,109,066.
Patented Sept. 1, 1914.
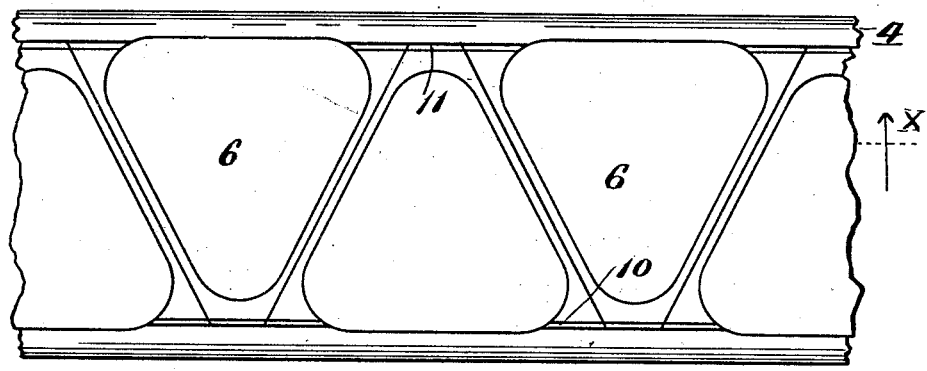
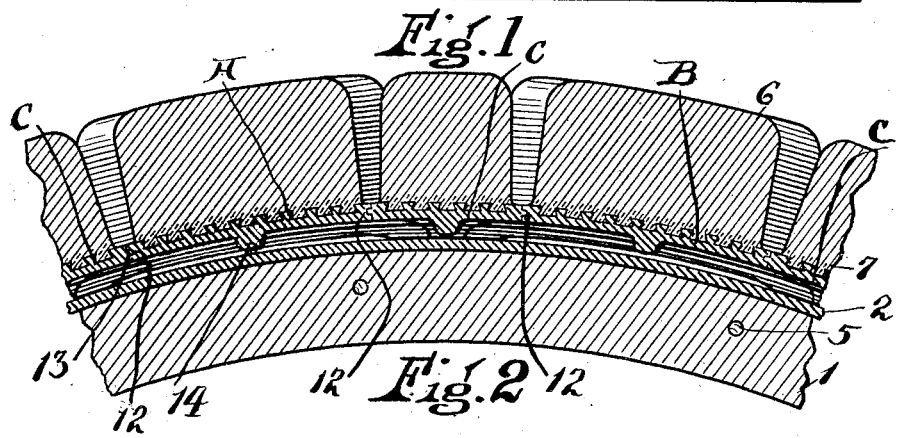
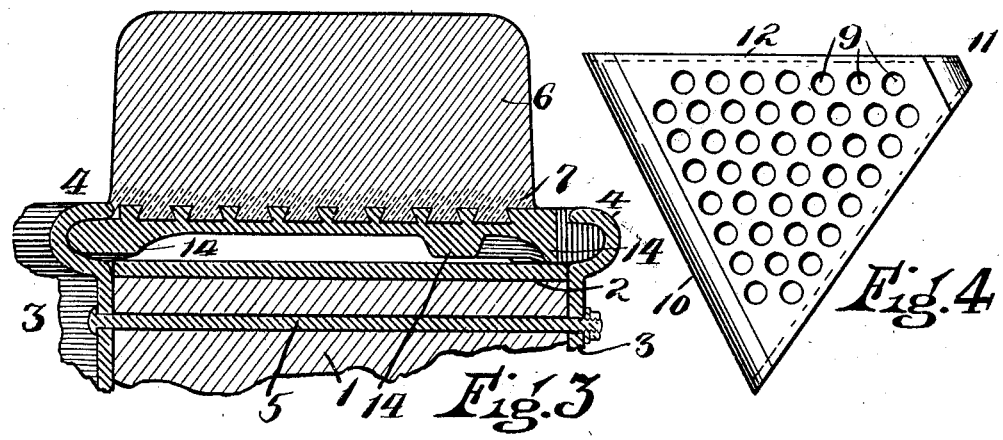
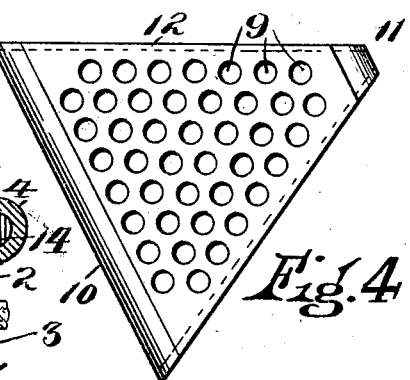
Witnesses:
G. L. McClintock
L. B. Stahl
Inventor—
Edward J. Hemington,
By C. E. Humphrey
ATTORNEY.

UNITED STATES PATENT OFFICE.

EDWARD J. HEMINGTON, OF AKRON, OHIO.

TIRE.

1,109,066. Specification of Letters Patent. Patented Sept. 1, 1914.

Application filed October 24, 1913. Serial No. 797,119.

*To all whom it may concern:*

Be it known that I, EDWARD J. HEMINGTON, a citizen of the United States, residing at Akron, in the county of Summit and State of Ohio, have invented new and useful Improvements in Tires, of which the following is a specification.

This invention relates to improvements in what are known as block tires, and the object of the invention is to provide a tire composed of a plurality of blocks each of which comprises a body of elastic material, such, for instance, as rubber, and each mounted on an individual metallic plate, all plates being provided with means to permit their interengagement when seated on a wheel rim.

Further objects of the invention are to fashion each plate and the corresponding block held thereby in the form of a triangle with the angles thereof rounded and with the blocks disposed with their apices alternately arranged with respect to the bases of coadjacent blocks thereby providing a circumferentially-extending series of road-engaging elastic blocks each mounted on its respective base plate with the points or apices arranged in alternating relation with respect to coadjacent blocks.

A further object is to form the inner face of each of the metallic plates on which the blocks are seated, concave, so as to allow only three points of contact between the plates and the felly-band on which they are mounted, these contact points being arranged at the angles of the blocks so that the plates are adapted to fit bands of different diameters, and seat perfectly thereon.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a plan view of a section of the rim portion of a vehicle wheel equipped with a tire embodying this invention; Fig. 2, is a transverse sectional view of Fig. 1 on line X thereof; Fig. 3, is a transverse sectional view of the rim portion of a vehicle wheel showing a block and its plate, also a section; and, Fig. 4, is a plan view of a plate embodying this invention.

Referring to the drawings in detail, the reference numeral 1 denotes the felly of a vehicle wheel on which is mounted the usual felly band 2 and along the sides of the wheel are positioned annular rings 3 provided with inturned clencher flanges 4 of ordinary type and constituting tire-holding means. The annular rings 3 are secured to the side faces of the wheel through the medium of cross bolts 5 in the ordinary way. The channel or seat for the tire, hereinbefore described, is common, and a further description thereof is believed to be unnecessary.

The tire which forms the primary portion of this invention embodies a plurality of blocks 6 preferably triangular in form and formed of elastic material, and also formed with their inner portions provided at 7 with hard rubber for the reason that the blocks are adapted to be secured by vulcanization to metallic plates, and as the soft rubber of the treads of the blocks does not vulcanize successfully to the metallic plate, an interposed layer of hard rubber overcomes this objection by affording perfect union with the soft rubber of the tread 6 and intimately unites with the metallic plates on which the blocks are mounted.

In practice, the angles or corners of the blocks will preferably be rounded as shown. Each of the blocks is mounted on a plate approximately triangular in form and each plate is provided in its upper face with a plurality of recesses 9 into which the rubber of the tire enters and clenches or is anchored. Each of the plates is triangularly-formed and comprises a base 10 and an apex 11, both of which are rounded to fit under and be engaged by the inturned clencher flanges 4 of the tire-retaining rings 3. A portion of the plates, for instance, A, B, etc., (see Fig. 2) are provided with lateral grooves 12 and the interposed or alternating plates are provided with projecting tongues or ridges 13 adapted to interengage with the grooves 12 in the coadjacent plates. The blocks are so arranged on the felly-band 2 that the apices of every alternate block extends laterally in the same direction and alternate with respect to the bases of contiguous blocks.

When positioned on a felly-band the plates C provided with the tongues or ridges 13 are interposed between the plates which bear the blocks A and B, for instance, and these latter are provided with lateral grooves, so that all of the plates throughout the circumference of the felly-band are caused to interengage. And if, for instance, there is a slight variation in the circumference of the felly-band on which the blocks are mounted, the wedging action set up by the interengagement of the triangularly-shaped blocks with each other will cause them to snugly engage and interlock as the tire-retaining rings 3 are clamped toward each other by the bolts 5. The curved ends 10 and 11 of the plates will engage under the over-hanging clencher flanges 4 and be thereby locked in position and as there is a tongue and groove or groove and channel, engagement between all of the blocks, the blocks will be held in position on the face of the felly-band and it is obvious that any slight discrepancy or excess of material in the blocks when placed on the outer face of the felly-band will be taken care of by the wedging action set up in positioning the plates and effecting their interengagement one with another. In order to form these plates so that they will fit the wheels of varying diameters, the inner face of the blocks are formed concave with inwardly-extending bearing lugs or feet 14 on their inner faces which gives three points of contact for each plate on the outer face of the felly-band, that is to say, there will be an inwardly-turned foot or lug at the apex of each corner of each triangularly-shaped block, thereby providing three points of contact or feet for supporting plates.

It will be obvious that in order to constitute a tire in accordance with this invention, two styles of plates for the reception of blocks will be needed. That is, one plate, for instance, will be provided on both its lateral faces with grooves and the next and coadjacent plate will be provided on both of its lateral faces with laterally-projecting tongues or ridges which engage in the grooves of the coadjacent plates and as the blocks so constructed are alternate in position with respect to each other throughout the circumference of the tire, interengagement and coöperation is effected and each plate is complemental to a coadjacent plate.

I claim:—

1. A vehicle tire of the block type adapted to be positioned on the felly band of a vehicle wheel comprising a plurality of metallic plates, all of said plates triangular in outline and disposed with apices alternating with the bases of coadjacent blocks, a portion of said plates provided on their lateral faces with grooves and the alternating plates provided with lateral ridges arranged to interengage with the grooves of the other plates, all of said plates provided with resilient blocks secured thereto.

2. A tire for vehicles comprising a plurality of metallic plates triangular in outline and each provided with a block of resilient material and secured to the outer face thereof, the opposite face of the block concave and provided with three projecting lugs arranged to seat on the periphery of a wheel, said lugs being arranged approximately at the corners of said blocks.

In testimony whereof I have hereunto set my hand in presence of two subscribing witnesses.

EDWARD J. HEMINGTON.

Witnesses:
  R. L. KRYDER,
  C. E. HUMPHREY.